United States Patent
Fujiwara et al.

(10) Patent No.: US 10,192,652 B2
(45) Date of Patent: Jan. 29, 2019

(54) MULTI-COVER BUS BAR UNIT FOR ROTARY MACHINES

(71) Applicants: HONDA MOTOR CO., LTD, Minato-ku, Tokyo (JP); Takagi Seiko Corporation, Takaoka-shi, Toyama (JP)

(72) Inventors: Hidetomo Fujiwara, Utsunomiya (JP); Takuya Yoshizawa, Saitama (JP); Kazuya Hirota, Takaoka (JP); Yoshifumi Onishi, Takaoka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/666,710

(22) Filed: Aug. 2, 2017

(65) Prior Publication Data
US 2018/0040392 A1    Feb. 8, 2018

(30) Foreign Application Priority Data
Aug. 3, 2016    (JP) .................. 2016-153145

(51) Int. Cl.
| | |
|---|---|
| *H01B 5/02* | (2006.01) |
| *H02K 3/28* | (2006.01) |
| *H02K 3/12* | (2006.01) |
| *H02K 3/50* | (2006.01) |
| *H02K 5/22* | (2006.01) |

(52) U.S. Cl.
CPC .................. *H01B 5/02* (2013.01); *H02K 3/12* (2013.01); *H02K 3/28* (2013.01); *H02K 3/50* (2013.01); *H02K 5/225* (2013.01); *H02K 2203/09* (2013.01)

(58) Field of Classification Search
None
See application file for complete search history.

(56) References Cited

U.S. PATENT DOCUMENTS

| | | | | |
|---|---|---|---|---|
| 8,225,484 | B2* | 7/2012 | Utaka | H02K 15/0037 |
| | | | | 29/596 |
| 8,749,107 | B2* | 6/2014 | Trammell | H02K 3/50 |
| | | | | 310/215 |
| 8,939,803 | B2* | 1/2015 | Nakamura | H02K 3/522 |
| | | | | 439/877 |
| 9,325,213 | B2* | 4/2016 | Egami | H02K 5/225 |
| 9,337,693 | B2* | 5/2016 | Takahashi | H02K 3/12 |
| 9,337,694 | B2* | 5/2016 | Egami | H02K 3/522 |
| 9,419,491 | B2* | 8/2016 | Egami | H02K 3/50 |
| 9,825,509 | B2* | 11/2017 | Nagumo | H02K 11/27 |
| 9,853,373 | B2* | 12/2017 | Kurono | H01R 9/2416 |

(Continued)

FOREIGN PATENT DOCUMENTS

JP    2015-133873 A    7/2015

*Primary Examiner* — Chau N Nguyen
*Assistant Examiner* — Muhammed Azam
(74) *Attorney, Agent, or Firm* — Amin, Turocy & Watson LLP (57) ABSTRACT

A bus bar unit includes a plurality of bus bars that electrically connects coils of each phase of a rotary electric machine and an external power supply, a plurality of caps that separately covers portions of the plurality of bus bars and separately hold the plurality of bus bars, and an outer holding section that is formed of an insulating material, that collectively covers the plurality of caps, and that is formed in a state in which the plurality of bus bars are electrically insulated.

6 Claims, 7 Drawing Sheets

(56) References Cited

U.S. PATENT DOCUMENTS

| | | | |
|---|---|---|---|
| 2004/0017125 A1* | 1/2004 | Nakamura | H02K 3/04 310/201 |
| 2004/0256941 A1* | 12/2004 | Yoneda | H02K 3/18 310/179 |
| 2005/0253466 A1* | 11/2005 | Seguchi | H02K 3/12 310/71 |
| 2009/0152975 A1* | 6/2009 | Sasaki | H02K 3/522 310/195 |
| 2009/0256439 A1* | 10/2009 | Inoue | H02K 3/522 310/71 |
| 2011/0012450 A1* | 1/2011 | Umeda | H02K 3/12 310/71 |
| 2011/0095639 A1* | 4/2011 | Nakamura | H02K 3/28 310/207 |
| 2011/0133593 A1* | 6/2011 | Nakamura | H02K 3/12 310/201 |
| 2011/0173800 A1* | 7/2011 | Akimoto | H02K 3/28 29/596 |
| 2011/0174037 A1* | 7/2011 | Akimoto | H02K 3/28 72/127 |
| 2011/0174038 A1* | 7/2011 | Akimoto | H02K 3/28 72/146 |
| 2011/0175472 A1* | 7/2011 | Koike | H02K 3/12 310/71 |
| 2011/0175483 A1* | 7/2011 | Koike | H02K 3/12 310/201 |
| 2011/0181146 A1* | 7/2011 | Asano | H02K 3/12 310/208 |
| 2011/0234031 A1* | 9/2011 | Kato | H02K 3/28 310/71 |
| 2012/0032551 A1* | 2/2012 | Yoneda | H02K 3/12 310/214 |
| 2012/0161569 A1* | 6/2012 | Hisada | H02K 3/28 310/201 |
| 2013/0264899 A1* | 10/2013 | Goto | H02K 3/50 310/71 |
| 2013/0270973 A1* | 10/2013 | Ikemoto | H02K 11/0047 310/68 C |
| 2014/0062230 A1* | 3/2014 | Mori | H02K 3/12 310/58 |
| 2014/0062236 A1* | 3/2014 | Taniguchi | H02K 3/28 310/71 |
| 2014/0111037 A1* | 4/2014 | Funakoshi | H02K 3/522 310/43 |
| 2014/0125185 A1* | 5/2014 | Suzuki | H02K 3/28 310/198 |
| 2014/0145564 A1* | 5/2014 | Taniguchi | H02K 11/0021 310/68 B |
| 2014/0183993 A1* | 7/2014 | Takasaki | H02K 3/50 310/71 |
| 2014/0232223 A1* | 8/2014 | Takasaki | H02K 3/50 310/71 |
| 2014/0246939 A1* | 9/2014 | Murakami | H02K 1/148 310/156.05 |
| 2014/0246940 A1* | 9/2014 | Murakami | H02K 29/12 310/156.49 |
| 2014/0319942 A1* | 10/2014 | Nakayama | H02K 15/0435 310/71 |
| 2014/0339948 A1* | 11/2014 | Matsuoka | H02K 3/14 310/198 |
| 2014/0346915 A1* | 11/2014 | Ishigami | H02K 15/0081 310/201 |
| 2014/0354094 A1* | 12/2014 | Yazaki | H02K 3/522 310/71 |
| 2015/0022046 A1* | 1/2015 | Shibata | H02K 3/28 310/208 |
| 2015/0076945 A1* | 3/2015 | Kudou | H02K 3/28 310/71 |
| 2015/0076953 A1* | 3/2015 | Tamura | H02K 3/28 310/208 |
| 2015/0084448 A1* | 3/2015 | Nonaka | H02K 3/44 310/43 |
| 2015/0097453 A1* | 4/2015 | Nishikawa | H02K 3/50 310/71 |
| 2015/0108857 A1* | 4/2015 | Takahashi | H02K 9/19 310/54 |
| 2015/0222155 A1* | 8/2015 | Nakayama | H02K 3/12 310/208 |
| 2015/0280507 A1* | 10/2015 | Kayano | H02K 3/28 310/54 |
| 2015/0295477 A1* | 10/2015 | Koizumi | H02K 3/12 310/68 C |
| 2015/0340919 A1* | 11/2015 | Murakami | H02K 5/225 310/71 |
| 2015/0381000 A1* | 12/2015 | Tamura | H02K 3/28 310/207 |
| 2016/0020658 A1* | 1/2016 | Tamura | H02K 9/19 310/54 |
| 2016/0094102 A1* | 3/2016 | Hoshina | H02K 3/28 310/71 |
| 2016/0134164 A1* | 5/2016 | Margueritte | H02K 3/18 310/71 |
| 2016/0336829 A1* | 11/2016 | Haruno | H02K 3/522 |
| 2018/0040392 A1* | 2/2018 | Fujiwara | H01B 5/02 |
| 2018/0090257 A1* | 3/2018 | Ishihara | H01F 17/06 |

\* cited by examiner

MULTI-COVER BUS BAR UNIT FOR ROTARY MACHINES

CROSS-REFERENCE TO RELATED APPLICATION

Priority is claimed on Japanese Patent Application No. 2016-153145, filed Aug. 3, 2016, the contents of which are incorporated herein by reference.

BACKGROUND OF THE INVENTION

Field of the Invention

The present invention relates to a bus bar unit.

Description of Related Art

In a rotary electric machine, as coils of each phase are electrically connected to an external power supply by separate power lines, power is supplied to the coils of each phase from the external power supply. Japanese Unexamined Patent Application, First Publication No. 2015-133873 discloses a configuration in which power lines corresponding to coils of respective phases are molded integrally by a fixing member.

Incidentally, in the configuration of Japanese Unexamined Patent Application, First Publication No. 2015-133873, wire rods are used as the power lines. In this configuration, it is difficult to position the power lines with respect to the fixing member during formation of the fixing member. This leads to complication of a manufacturing process, manufacturing cost is increased, and stabilization of quality is difficult. In addition, when the wire rod is used as the power line, after assembly to the rotary electric machine, the power line is likely to be flexibly deformed due to vibrations or the like, and durability cannot be easily secured.

SUMMARY OF THE INVENTION

Here, in recent times, use of a bus bar having higher stiffness than the wire rod as the power line configured to perform connection between a rotary electric machine and an external power supply has been reviewed. This configuration is considered to enable improvement in durability after assembly while achieving reduction in cost and stabilization of quality.

However, since the bus bar has higher stiffness than the wire rod, further improvement in positional accuracy is required when bus bars corresponding to the phases are molded integrally. That is, when the bus bars are molded integrally, the assembly is formed by filling the mold with a resin material in a state in which the bus bars are disposed at predetermined positions in the mold before forming. Here, if positions of the bus bars are deviated or flexibly deformed in the mold, a relative position of the bus bars after forming may be deviated.

In addition, in order to perform posture control of the bus bar in the mold, forming a pressure relief hole in the bus bar can be considered. However, when the pressure relief hole is formed in the bus bar, a cross-sectional area of the bus bar is reduced, and thus deterioration of conducting performance may occur.

Further, when the bus bar is positioned in the mold by a positioning pin or the like, the bus bar may be exposed to the outside through a molding hole formed in the shape of the positioning pin after molding.

An aspect of the present invention is to provide a bus bar unit capable of improving durability after assembly while achieving reduction in cost and stabilization of quality.

A bus bar according to the present invention employs the following configurations.

(1) A bus bar unit according to an aspect of the present invention includes a plurality of bus bars that electrically connects coils of each phase of a rotary electric machine and an external power supply; a plurality of inner holding sections that separately covers portions of the plurality of bus bars and separately hold the plurality of bus bars; and an outer holding section that is formed of an insulating material, that collectively covers the plurality of inner holding sections, and that is formed in a state in which the plurality of bus bars are electrically insulated.

(2) In the aspect of above mentioned (1), each of the plurality of bus bars may include: a first extension section extending in a first direction; and a second extension section connected to the first extension section and extending in a second direction crossing the first direction, and the inner holding sections may separately support regions of the plurality of bus bars from at least the first extension section to the second extension section via a first connecting portion connecting the first extension section and the second extension section.

(3) In the aspect of above mentioned (2), each of the plurality of bus bars may include a third extension section connected to the second extension section and extending in a third direction crossing the first direction and the second direction, and the inner holding sections may separately support regions of the plurality of bus bars from at least the first extension section to the third extension section via the first connecting portion and via a second connecting portion connecting the second extension section and the third extension section.

(4) In the aspect of any one of above mentioned (1) to (3), the inner holding sections may be formed of an insulating material.

(5) In the aspect of any one of above mentioned (1) to (4), coated sections that separately cover portions of the plurality of bus bars different from the portions supported by the outer holding section, and on which powder coating is performed by an insulating powder material may be provided, and air vent holes that exposes the bus bars may be formed in the coated sections.

(6) In the aspect of any one of above mentioned (1) to (5), the inner holding sections may be separately mounted on the plurality of bus bars.

(7) In the aspect of above mentioned (6), the inner holding sections may have insertion opening sections into which the bus bars are inserted.

According to the aspect of above mentioned (1), in the bus bars, a forming portion of the outer holding section can be reinforced by the inner holding sections. Accordingly, during forming of the outer holding section, positional deviation or deflection of the bus bars in the mold due to an injection pressure or the like can be suppressed, and the bus bars can be accurately positioned in the mold. Accordingly, the manufacturing process can be simplified, and reduction in cost and stabilization of quality can be achieved. Further, in the aspect, as the bus bars are used to connect the rotary electric machine and the external power supply, durability can be improved in comparison with the case in which the rotary electric machine and the external power supply are connected by the wire rod.

In addition, as the bus bars are reinforced by the inner holding sections, for example, a decrease in conducting performance of the bus bars can be suppressed in comparison with the case in which pressure relief holes are formed in the bus bars to perform posture control of the bus bars.

Further, as the outer holding section is formed in a state in which the inner holding sections are supported by the positioning pins or the like, exposure of the bus bars to the outside through the molding holes formed in the shape of the positioning pins during forming of the outer holding section can be suppressed. Accordingly, an insulation property of the bus bars can be secured.

As a result, further stabilization of quality can be achieved.

According to the aspect of above mentioned (2), as the region from the first extension section to the second extension section via the first connecting portion is supported by the inner holding sections, the bent portions of the bus bars having a relatively low stiffness can be reinforced by the inner holding sections.

According to the aspect of above mentioned (3), as the region from the first extension section to the third extension section via the first connecting portion and via the second connecting portion is supported by the inner holding sections, the bus bars can be held 3-dimensionally. Accordingly, the bus bars can be securely reinforced. In addition, since a positional deviation of the inner holding sections with respect to the bus bars can be suppressed, further simplification of the manufacturing process can be achieved.

According to the aspect of above mentioned (4), since the inner holding sections are formed of an insulating material, spaces between the bus bars in the outer holding section are divided by the inner holding sections. For this reason, even when a liquid enters the outer holding section due to a capillary phenomenon or the like from an interface between the outer holding section and the bus bars, it is possible to suppress the liquid from bridging the neighboring bus bars and suppress a short circuit (a phase fault) of the bus bars. In addition, even when the liquid enters the inner holding section that holds one of the bus bars, it is possible to suppress the liquid from reaching the other bus bars. This can also suppress the phase fault of the bus bars.

According to the aspect of above mentioned (5), when the coated section is exposed to a high temperature during powder coating and air between the inner surface of the coated section and the surface of the bus bar expands, the expanded air is discharged to the outside of the coated section through the air vent holes. For this reason, occurrence of a cavity or the like in the coated section can be suppressed, and occurrence of problems in insulation due to the cavity or the like can be suppressed.

According to the aspect of above mentioned (6), since the inner holding sections formed separately from the bus bars are mounted on the bus bars, further simplification of the manufacturing process can be achieved. In addition, unlike the case in which the inner holding section and the outer holding section are formed by, for example, two color formation or the like, a positional deviation of the bus bars due to an injection pressure or the like during primary forming (during forming the inner holding sections) can be suppressed. Accordingly, further stabilization of quality can be achieved.

According to the aspect of above mentioned (7), as the bus bars are inserted into the inner holding sections through the insertion opening sections, the bus bars can be simply held by the inner holding sections.

In addition, as the insertion opening section is formed to match a minimum value of the plate thickness of the bus bars, a clearance between the bus bars and the inner holding section (an opening edge of the insertion opening section) can be reduced. For this reason, burrs generated due to the clearance between the bus bars and the inner holding section can be suppressed. Further, when the inner holding section is formed of a resin material or the like, even if a plate thickness of the bus bars is larger than that of the insertion opening section due to a tolerance of the bus bars, the bus bars can be inserted into the inner holding section while pushing and expanding the insertion opening section. Accordingly, the clearance between the bus bars and the inner holding section can be reduced regardless of a variation in plate thickness of the bus bars.

DETAILED DESCRIPTION OF THE INVENTION

Hereinafter, an embodiment of the present invention will be described with reference to the accompanying drawings.
[Rotary Electric Machine]

Figure 1:
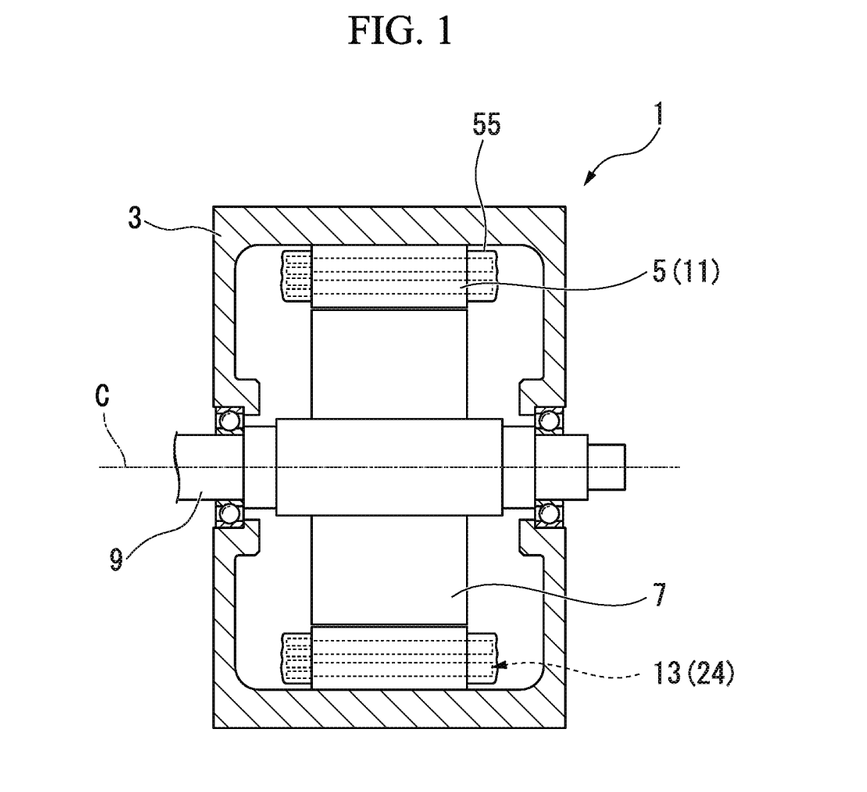
FIG. 1 is a cross-sectional view showing the entire configuration of a rotary electric machine including a bus bar unit according to an embodiment of the present invention.

FIG. 1 is a schematic configuration view (a cross-sectional view) showing the entire configuration of a rotary electric machine 1 including a bus bar unit 15 according to the embodiment.

The rotary electric machine 1 shown in FIG. 1 is a traveling motor mounted in a vehicle such as a hybrid vehicle or an electric vehicle. However, a configuration of the present invention is not limited to a traveling motor and may be applied to a generating motor or a motor for other uses, or a rotary electric machine (including a generator) for nonvehicular uses.

The rotary electric machine 1 includes a case 3, a stator 5, a rotor 7 and an output shaft 9.

The output shaft 9 is rotatably supported by the case 3.

The rotor 7 is formed in a tubular shape fitted onto the output shaft 9. Further, in the following description, a direction along an axis C of the output shaft 9 is simply referred to as an axial direction, a direction perpendicular to the axis C is referred to as a radial direction, and a direction around the axis C is referred to as a circumferential direction.

Figure 2:
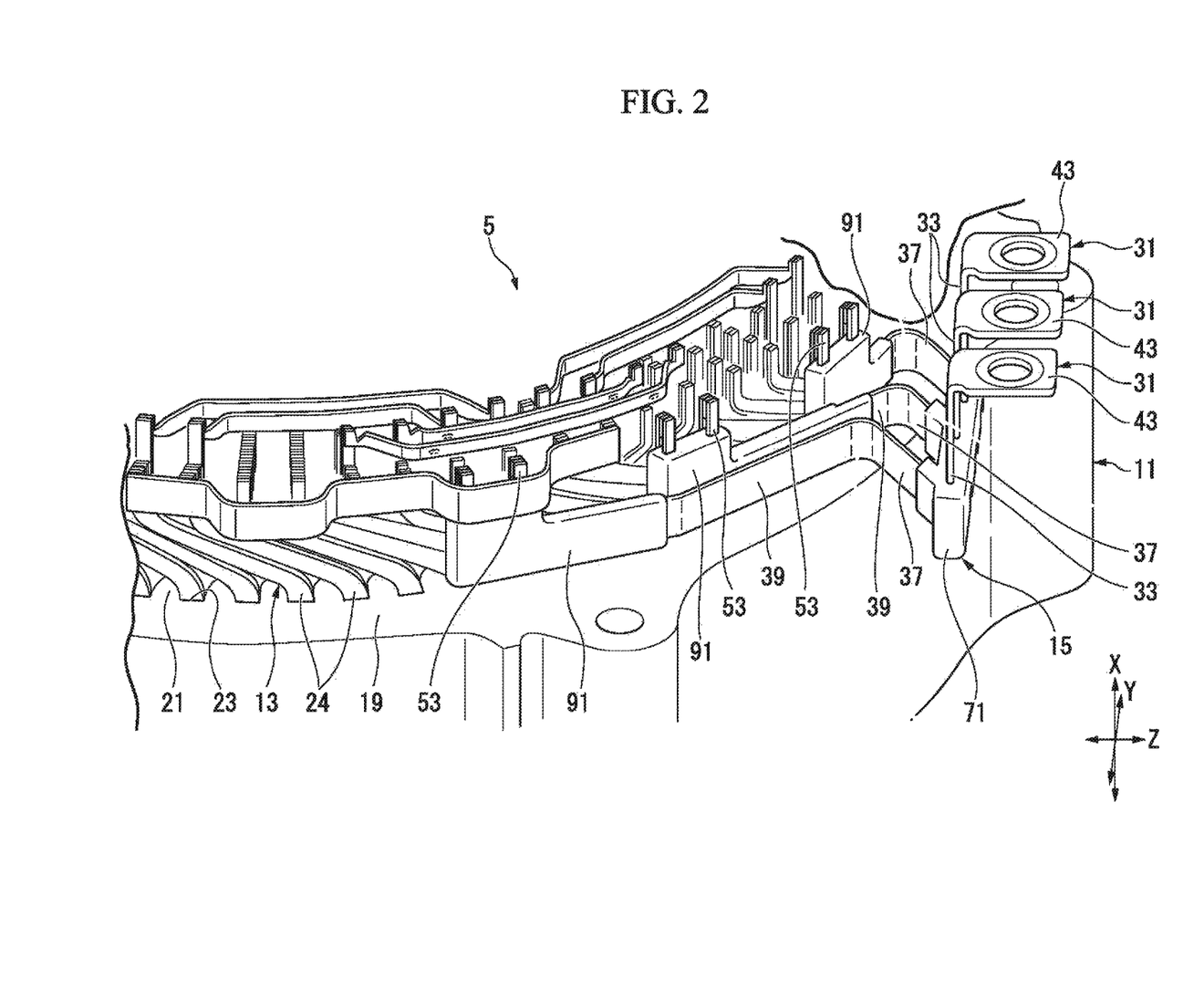
FIG. 2 is a perspective view showing a portion of a stator according to the embodiment.

FIG. 2 is a perspective view showing a portion of the stator 5.

As shown in FIG. 2, the stator 5 includes a stator core 11, a coil 13 mounted on the stator core 11, and the bus bar unit 15 configured to connect the coil 13 and an external power supply (not shown).

The stator core 11 is formed in a tubular shape that surrounds the rotor 7 (see FIG. 1) from the outside in the radial direction. Specifically, the stator core 11 has a tubular core main body 19 and tooth sections 21.

The core main body 19 is fixed to an inner circumferential surface of the above-mentioned case 3 (see FIG. 1) by fitting or the like.

The tooth sections 21 protrude from an inner circumferential surface of the core main body 19 toward the inside in the radial direction. The plurality of tooth sections 21 are formed in the circumferential direction at intervals. Then, slots 23 into which the coils 13 are inserted are formed between the tooth sections 21 neighboring in the circumferential direction. That is, the slots 23 pass through the stator core 11 in the axial direction.

The coils 13 are 3-phase coils constituted by a U phase, a V phase and a W phase. The coils 13 of each phase of the embodiment are formed by connecting a plurality of corresponding segment coils 24 to each other. The segment coils 24 are inserted into the slots 23 of the stator core 11 and mounted on the stator core 11. The segment coils 24 having the same phase are joined to the stator core 11 at one side in the axial direction by TIG welding, laser welding, or the like. Further, configurations of the coils 13 may be appropriately modified. For example, the coils 13 are not limited to the segment coils 24 and may be mounted on the stator core 11 through a method such as being wound on the tooth sections 21. In addition, while the coils 13 of the embodiment are mounted on the stator core 11 through distributed winding, there is no limitation thereto and the coils 13 may be mounted on the stator core 11 through concentrated winding.

<Bus Bar Unit>

Figure 3:
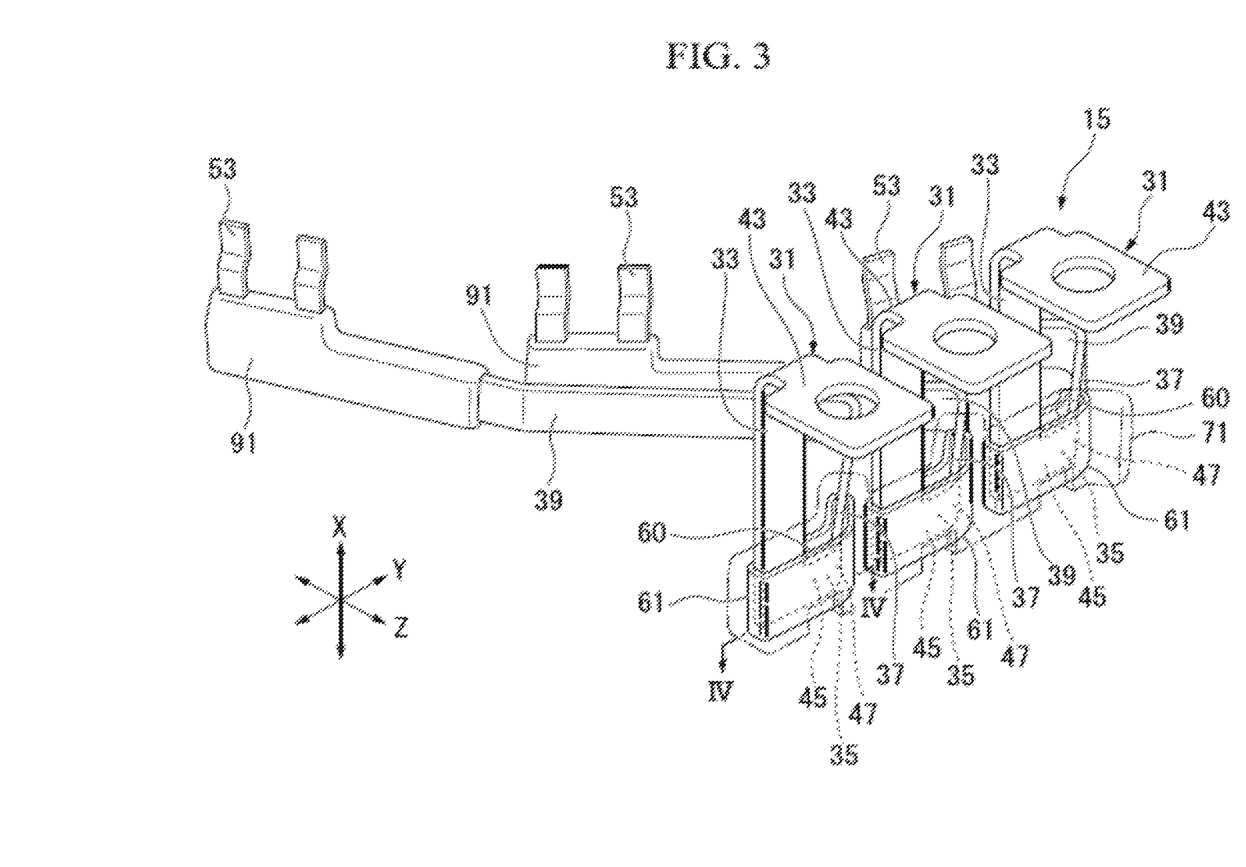
FIG. 3 is a perspective view showing the bus bar unit according to the embodiment from one side in an X direction.

FIG. 3 is a perspective view of the bus bar unit 15.

As shown in FIG. 3, the bus bar unit 15 includes a plurality of bus bars 31, a plurality of caps (inner holding sections) 61, an outer holding section 71 and a plurality of coated sections 91. Further, in FIG. 3, the outer holding section 71 is shown by a two-dot chain line.

Each of the bus bars 31 may be formed in a 3-dimensional shape by performing sheet metal working on a plate member having conductivity such as a metal (for example, copper) or the like. The bus bars 31 are disposed in parallel in the circumferential direction. The bus bars 31 are formed in shapes corresponding to each other. For this reason, in the following description, one of the bus bars 31 will be exemplarily described. In addition, in the other bus bars 31, portions corresponding to the one of the bus bars 31 are designated by the same reference numerals and description thereof will be omitted.

Each of the bus bars 31 includes a first extension section 33, a second extension section 35 connected to the first extension section 33, a third extension section 37 connected to the second extension section 35, and a fourth extension section 39 connected to the third extension section 37. Further, in the following description, an extension direction of the first extension section 33 is referred to as an X direction, an extension direction of the second extension section 35 is referred to as a Y direction, and a direction perpendicular to the X direction and the Y direction is referred to as a Z direction. In the embodiment, the X direction coincides with the axial direction.

The first extension section 33 extends in the X direction (a first direction). An external connecting terminal 43 is continuously installed on one end portion of the first extension section 33 in the X direction. As shown in FIG. 2, the external connecting terminal 43 extends from one end portion of the first extension section 33 in the X direction toward one side in the Z direction (a direction away from the stator core 11). The external connecting terminal 43 is electrically connected to a terminal block of an external power supply (not shown).

Figure 4:
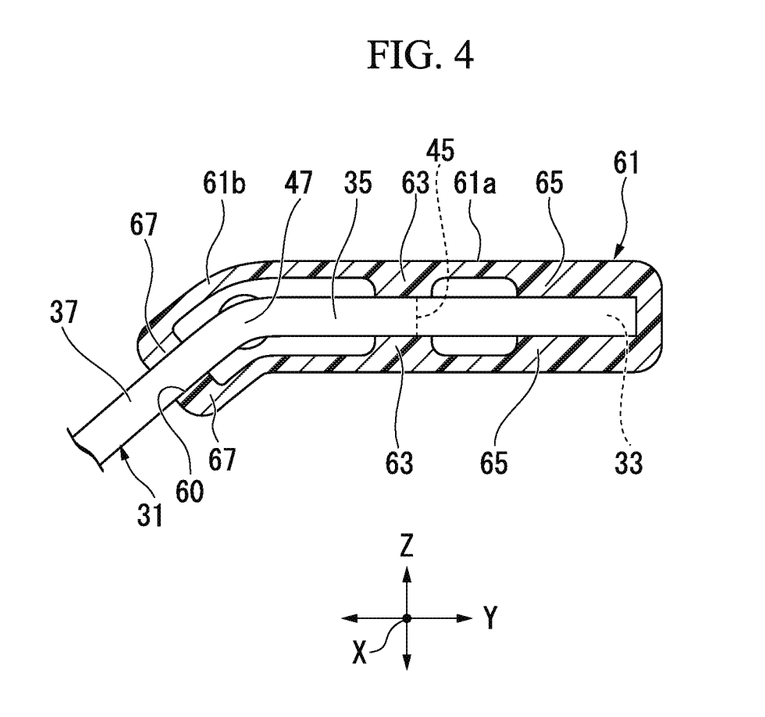
FIG. 4 is a cross-sectional view taken along line IV-IV of FIG. 3.

FIG. 4 is a cross-sectional view taken along line IV-IV of FIG. 3.

As shown in FIG. 4, one end portion of the second extension section 35 in the Y direction is connected to the other end portion of the first extension section 33 in the X direction. The second extension section 35 extends in a direction (a second direction) perpendicular to an extension direction of the first extension section 33 from the other end portion of the first extension section 33 in the X direction. Further, in the embodiment, the extension direction of the second extension section 35 is perpendicular to the first extension section 33 on the same plane as the extension direction of the first extension section 33.

One end portion of the third extension section 37 in the Z direction is connected to the other end portion of the second extension section 35 in the Y direction. The third extension section 37 extends in a direction (a third direction) crossing the extension directions of the first extension section 33 and the second extension section 35 from the other end portion of the second extension section 35 in the Y direction. Specifically, the third extension section 37 extends toward the other side in the Z direction to be inclined toward the other side in the Y direction.

As shown in FIG. 3, one end portion of the fourth extension section 39 in the Z direction is connected to the other end portion of the third extension section 37 in the Z direction. The fourth extension section 39 extends in a direction crossing the extension directions of the above-mentioned extension sections 33, 35 and 37 from the other end portion of the third extension section 37 in the Z direction. Specifically, the fourth extension section 39 extends toward the other side in the Z direction to be inclined toward one side in the Y direction.

A coil connecting terminal 53 is formed on the other end portion of the fourth extension section 39 in the Z direction.

The coil connecting terminal 53 extends from the other end portion of the fourth extension section 39 in the Z direction toward one side in the X direction. As shown in FIG. 2, the coil connecting terminals 53 of the bus bars 31 are separately bonded to the corresponding coils 13 (the segment coils 24) of each phase extracted to one side of the stator core 11 in the axial direction. Accordingly, the external power supply and the coils 13 of each phase are electrically connected in each phase by the bus bars 31. Then, power is supplied to the coils 13 from an external power supply through the bus bars 31.

Further, as shown in FIG. 1, powder coating is performed on a portion of the coil 13 protruding from the stator core 11 in the axial direction or a portion of the bus bar unit 15 (a periphery of the coil connecting terminal 53) (a powder coating section 55 in FIG. 1). The powder coating section 55 is formed, for example, by supplying insulating powder particles (powder paint) with fluidity and are further heating and thermally curing the powder particles.

As shown in FIG. 3, the caps 61 are formed of an insulating material such as a resin material or the like. The caps 61 separately cover portions of the bus bars 31 from the first extension section 33 to the third extension section 37. Specifically, the caps 61 cover a region from the other end portion of the first extension section 33 in the X direction to one end portion of the third extension section 37 in the Z direction via a connecting portion (a first connecting portion 45) between the first extension section 33 and the second extension section 35 and a connecting portion (a second connecting portion 47) between the second extension section 35 and the third extension section 37. The caps 61 hold the bus bars 31 with the bus bars 31 inserted therein in the thickness direction. The caps 61 are disposed at the same position in the X direction and arranged in the Y direction at intervals. Further, since the caps 61 are formed in the same configuration, in the following description, one of the caps 61 will be exemplarily described.

Insertion opening sections 60 configured for the bus bars 31 to be inserted thereinto are formed in the caps 61.

The insertion opening sections 60 are formed in portions of the caps 61 from portions directed toward one side in the X direction to portions directed toward the other side in the Z direction. The bus bars 31 are inserted into the caps 61 from one side in the X direction through the insertion opening section 60. Further, an opening width of the insertion opening section 60 in the Z direction may be set to be equal to a minimum plate thickness of the bus bars 31. However, the opening width of the insertion opening section 60 may be appropriately varied.

As shown in FIG. 4, each of the caps 61 has a first receiving section 61a configured to accommodate the first extension section 33 and the second extension section 35, and a second receiving section 61b configured to accommodate the third extension section 37.

The first receiving section 61a is formed in the shape of the first extension section 33 and the second extension section 35. The first receiving section 61a covers the other end portion of the first extension section 33 in the X direction and the entire region of the second extension section 35 from both sides in the Z direction and the other side in the X direction. First clamping sections 63 are formed on a pair of facing surfaces of inner surfaces of the first receiving section 61a in the Z direction. The first clamping sections 63 protrude from the same positions in the facing surfaces of the first receiving section 61a as the central portion of the second extension section 35 in the X direction and the Y direction toward the second extension section 35 in the Z direction. The first clamping sections 63 sandwich the second extension section 35 in the Z direction.

Second clamping sections 65 protruding toward the first extension section 33 and the second extension section 35 in the Z direction are formed on portions of the facing surfaces of the first receiving section 61a facing one end portions in the Y direction of the first extension section 33 and the second extension section 35 in the Z direction. The second clamping sections 65 sandwich the first extension section 33 and the second extension section 35 in the Z direction.

The second receiving section 61b is formed in the shape of the third extension section 37. The second receiving section 61b covers the third extension section 37 from both sides in the Z direction and the other side in the X direction. Third clamping sections 67 are formed on a pair of facing surfaces of inner surfaces of the second receiving section 61b facing each other in the Z direction. The third clamping sections 67 protrude from the other end portions of the facing surfaces of the second receiving section 61b in the Y direction toward the third extension section 37. The third clamping sections 67 sandwich the third extension section 37 in the Z direction.

Figure 5:
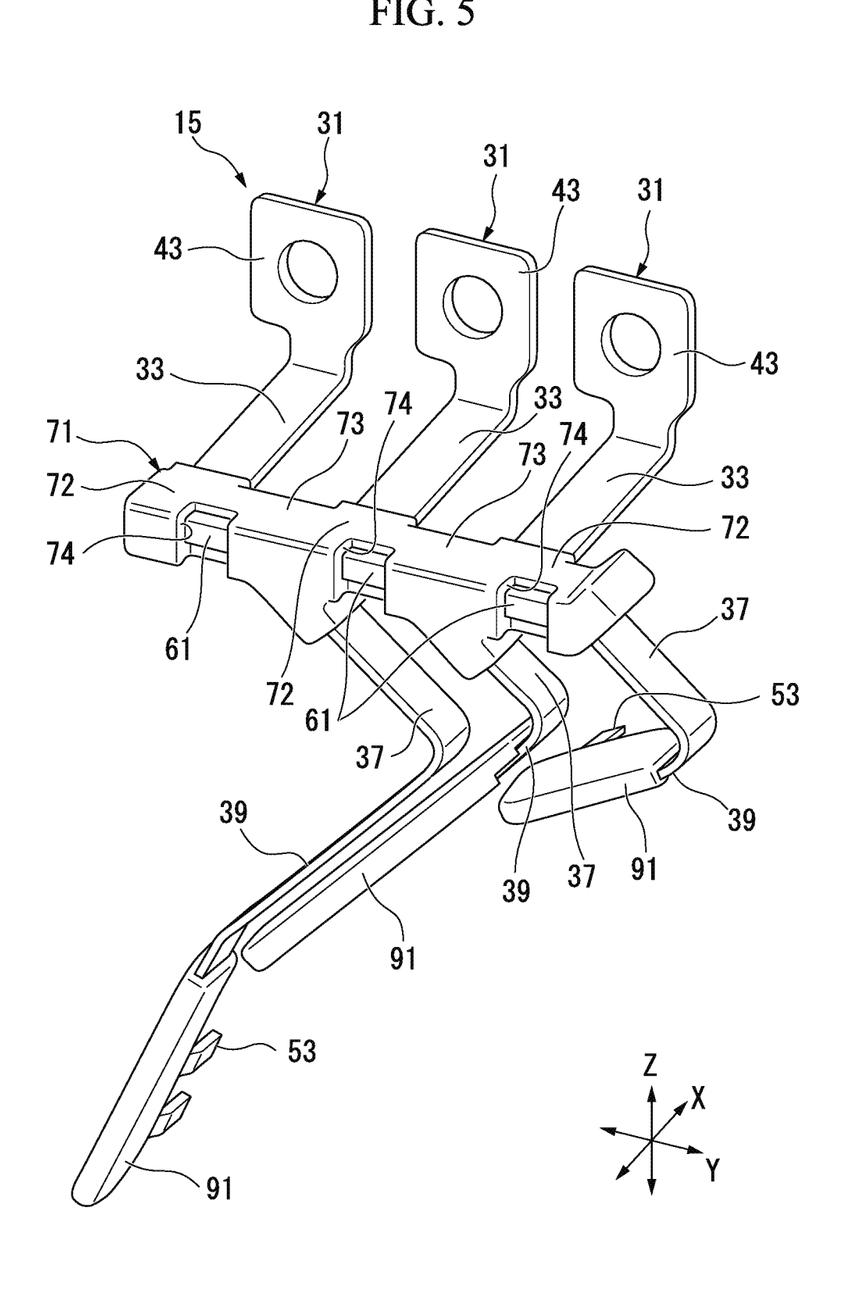
FIG. 5 is a perspective view showing the bus bar unit from the other side in the X direction.

FIG. 5 is a perspective view showing the bus bar unit 15 from the other side in the X direction.

As shown in FIG. 5, the outer holding section 71 collectively molds portions of the bus bars 31 on which the caps 61 are mounted in the Y direction at intervals. Specifically, the outer holding section 71 has cap coated sections 72 configured to cover the caps 61, and cap connecting portions 73 configured to connect the cap coated sections 72. Further, the outer holding section 71 is formed of the same material as the caps 61. However, the outer holding section 71 may be formed of a different material from the caps 61 as long as the material is an insulating material. In addition, while the outer holding section 71 in the embodiment covers only the outside of the caps 61, a portion thereof may enter the inside of the caps 61.

The cap coated sections 72 are formed somewhat larger than the caps 61 and cover the caps 61 from the outside as a whole. In this case, portions of the cap coated sections 72 disposed at one sides of the caps 61 in the X direction are adhered to the first extension sections 33 of the bus bars 31 to hold the first extension sections 33. In addition, portions of the cap coated sections 72 disposed at the other sides of the caps 61 in the Z direction are adhered to the third extension sections 37 of the bus bars 31 to hold the third extension sections 37. Exposure holes 74 configured to expose the caps 61 to the outside are formed in the other end portions of the cap coated sections 72 in the X direction.

The cap connecting portions 73 are formed between the cap coated sections 72 neighboring in the Y direction. Surfaces of the cap connecting portions 73 are smoothly continuous with surfaces of the cap coated sections 72.

Figure 6:
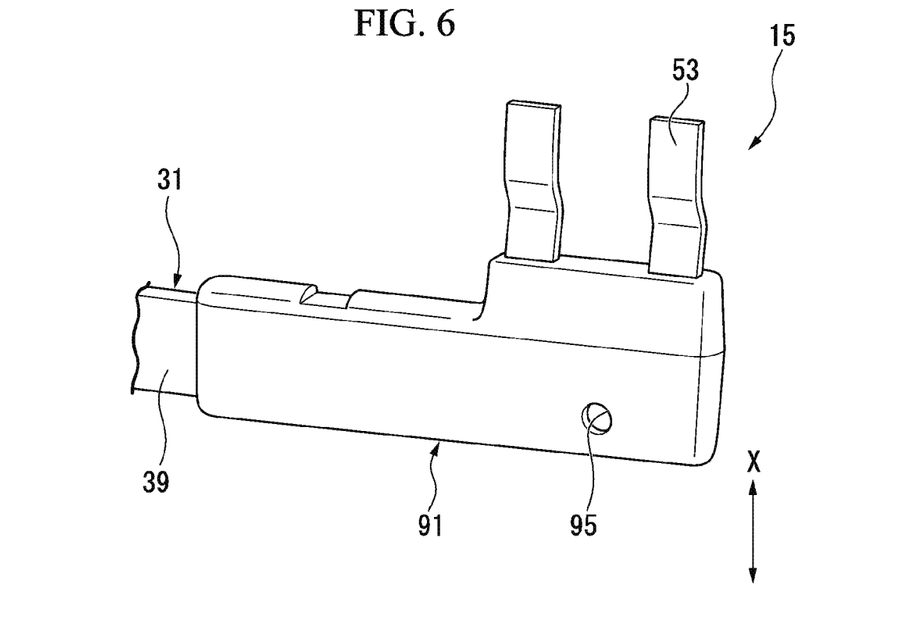
FIG. 6 is a perspective view showing a coated section in the bus bar unit according to the embodiment.

FIG. 6 is a perspective view of the coated section 91.

As shown in FIG. 6, the coated section 91 covers a portion from the other end portion of the fourth extension section 39 in the Z direction to the other end portion of the coil connecting terminal 53 in the X direction. An air vent hole 95 configured to bring the inside and the outside of the coated section 91 in communication with each other (expose the fourth extension section 39) is formed in the coated section 91. Further, the place, shape, number, and so on, in which the air vent hole 95 is formed may be appropriately modified as long as the air vent hole 95 is formed at a position of the coated section 91 covered by the powder coating section 55. In addition, the air vent hole may be formed in the outer holding section 71.

[Method of Manufacturing Bus Bar Unit]

Figure 7:
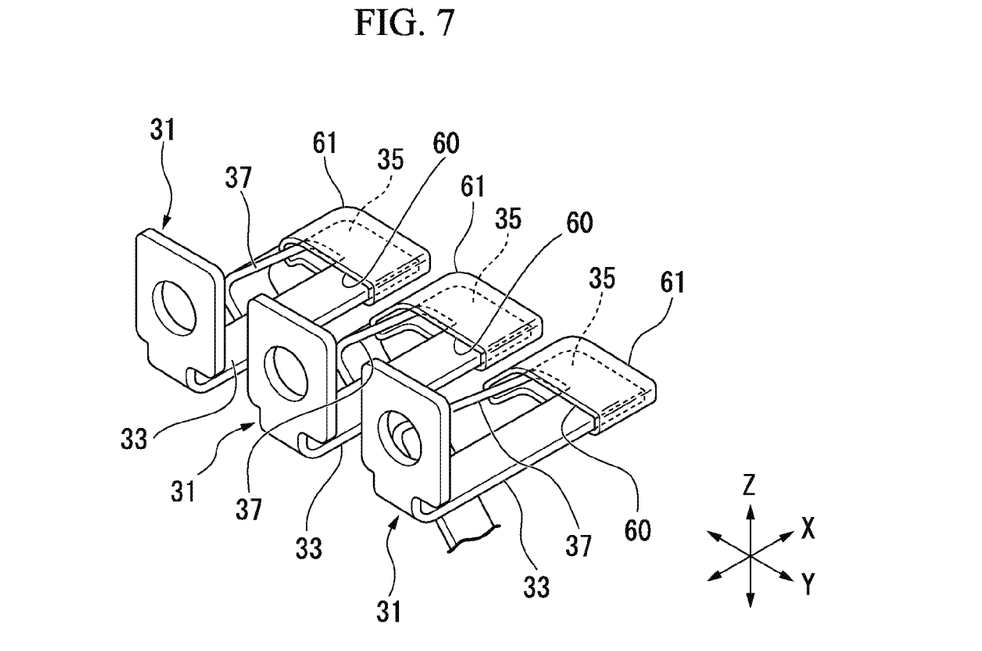
FIG. 7 is a perspective view showing a state in which caps are attached to bus bars in the bus bar unit according to the embodiment.

Next, a method of manufacturing the bus bar unit 15 will be described. FIG. 7 is a perspective view showing a state in which the caps 61 are attached to the bus bars 31.

First, as shown in FIG. 7, the caps 61 are mounted on the bus bars 31. Specifically, the bus bars 31 are inserted into the caps 61 through the insertion opening section 60 from one side in the X direction. Accordingly, portions of the bus bars 31 from the first extension section 33 to the third extension section 37 are separately held by the caps 61.

Figure 8:
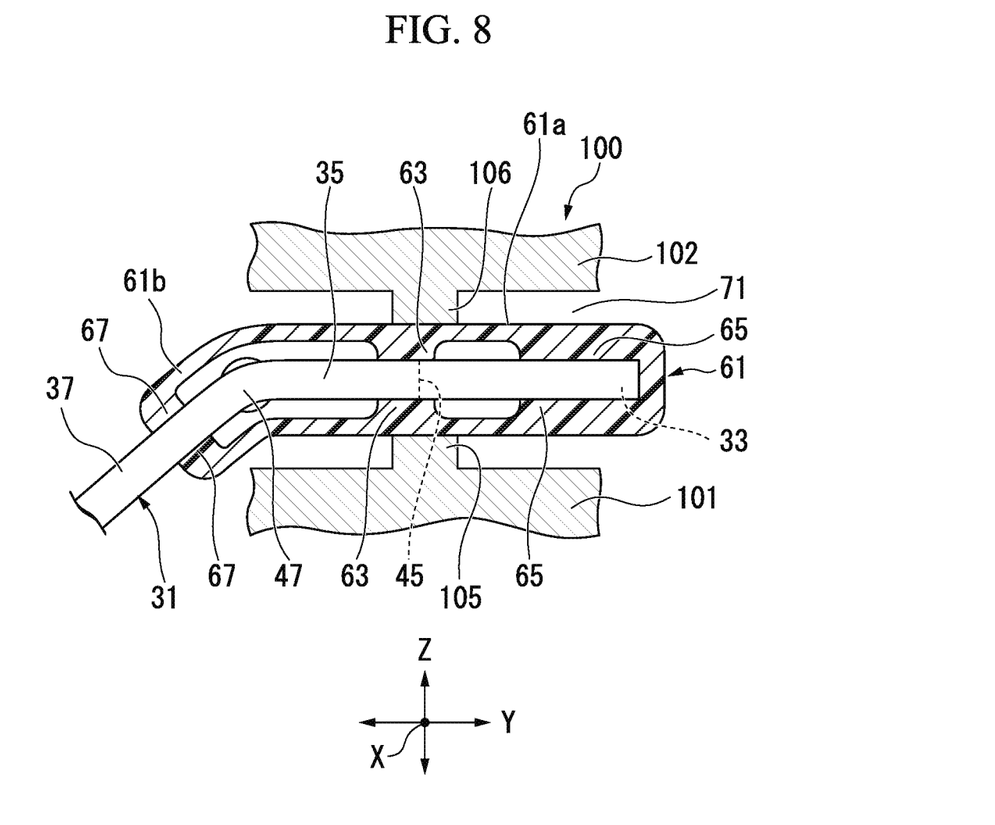
FIG. 8 is a cross-sectional view showing an outer holding section in the bus bar unit according to the embodiment during forming.

FIG. 8 is a cross-sectional view showing the outer holding section 71 during forming.

Next, as shown in FIG. 8, the bus bars 31 are set in a mold 100 and portions of the bus bars 31 on which the caps 61 are mounted are collectively molded. The mold 100 of the embodiment includes a lower mold 101 and an upper mold 102 that is relatively movable with respect to the lower mold 101 in the Z direction. A space defined by the lower mold 101 and the upper mold 102 constitutes a cavity configured to form the outer holding section 71. Further, positioning pins 105 and 106 configured to position the bus bars 31 in the mold 100 are formed in the lower mold 101 and the upper mold 102.

In forming the outer holding section 71 using the mold 100, first, in the bus bars 31, a forming region of the outer holding section 71 is sandwiched between the lower mold 101 and the upper mold 102 of the mold 100. Here, the bus bars 31 are set in the mold 100 such that portions of the caps 61 in which the first clamping sections 63 are formed are sandwiched by the positioning pins 105 and 106 in the Z direction. Accordingly, the bus bars 31 can be stably held in the mold 100. Further, the positioning pins may be formed at positions corresponding to the other clamping sections 65 and 67.

Next, the mold 100 is filled with a resin material in a melted state. Then, the mold 100 is filled with the resin material to cover the caps 61. Then, by opening the mold after the resin material solidifies, the bus bar unit 15 is completed. Further, as shown in FIG. 5, the exposure hole 74 is formed in the shape of the positioning pins 105 and 106 during forming of the outer holding section 71.

In this way, in the embodiment, a configuration including the caps 61 configured to separately hold the bus bars 31 and the outer holding section 71 configured to collectively cover the caps 61 is provided.

According to this configuration, in the bus bars 31, a forming portion of the outer holding section 71 is reinforced by the caps 61. Accordingly, during forming of the outer holding section 71, the bus bars 31 can be accurately positioned in the mold 100 by suppressing a positional deviation or deflection of the bus bars 31 in the mold 100 due to an injection pressure or the like. Accordingly, a manufacturing process can be simplified, and reduction in cost and stabilization of quality can be achieved. Further, in the embodiment, durability can be improved by using the bus bars 31 for connection of the rotary electric machine 1 and the external power supply in comparison with the case in which the rotary electric machine 1 and the external power supply are connected by the wire rod.

In addition, a decrease in conducting performance of the bus bars 31 can be suppressed by reinforcing the bus bars 31 using the caps 61, for example, in comparison with the case in which the posture control of the bus bars is performed by forming the pressure relief holes in the bus bars.

Further, as the outer holding section 71 is formed in a state in which the caps 61 are held by the positioning pins 105 and 106, exposure of the bus bars 31 to the outside through the exposure holes 74 formed in the shape of the positioning pins 105 and 106 during forming of the outer holding section 71 can be suppressed. Accordingly, an insulation property of the bus bars 31 can be secured.

As a result, further stabilization of quality can be achieved.

In the embodiment, the configuration in which the caps 61 mounted in the region including the second extension section 35 from the first extension section 33 via the first connecting portion 45 is provided.

According to this configuration, bent portions of the bus bars 31 having a relatively low stiffness can be reinforced by the caps 61. In addition, since the bent portions are relatively narrow portions between the neighboring bus bars 31, when the caps 61 are formed of an insulating material, insulation between the bus bars 31 can be secured.

In the embodiment, the configuration in which the caps 61 are mounted in the region from the first extension section 33 to the third extension section 37 via the first connecting portion 45 and the second connecting portion 47 is provided.

According to this configuration, since the bus bars 31 can be held 3-dimensionally, the bus bars 31 can be securely reinforced. In addition, since a positional deviation of the caps 61 with respect to the bus bars 31 can be suppressed, further simplification of the manufacturing process can be achieved.

In the embodiment, since the caps 61 are formed of an insulating material, spaces between the bus bars 31 in the outer holding section 71 are divided by the caps 61. For this reason, even when a liquid enters the outer holding section 71 from the interface between the outer holding section 71 and the bus bars 31 due to a capillary phenomenon or the like, it is possible to prevent the liquid from bridging the neighboring bus bars 31 and prevent a short circuit (a phase fault) of the bus bars 31. In addition, even when the liquid enters the cap 61 mounted on one of the bus bars 31, it is possible to suppress the liquid from reaching the other bus bars 31. This can also suppress the phase fault of the bus bars 31.

In the embodiment, the configuration in which the air vent holes 95 are formed in the coated sections 91 of the bus bars 31 is provided.

According to this configuration, when the coated sections 91 are exposed to a high temperature and air between the inner surfaces of the coated sections 91 and the surfaces of the bus bars 31 expands during powder coating, the expanded air is discharged to the outside of the coated sections 91 through the air vent holes 95. For this reason, generation of the cavity or the like in the coated sections 91 can be suppressed, and occurrence of problems in insulation due to the cavity or the like can be suppressed.

In the embodiment, since the caps 61 formed separately from the bus bars 31 are mounted on the bus bars 31, further simplification of the manufacturing process can be achieved. In addition, unlike the case in which the caps and the outer holding section 71 are formed by, for example, two color formation or the like, a positional deviation of the bus bars 31 due to the injection pressure or the like during primary forming (during forming of the caps) can be suppressed. Accordingly, further stabilization of quality can be achieved.

In addition, in the embodiment, as the bus bars 31 are sandwiched by the clamping sections 63, 65 and 67 formed on the caps 61, portions of the caps 61 other than the clamping sections 63, 65 and 67 can be formed thinly. Accordingly, sink marks or the like of the caps 61 can be suppressed, and the caps 61 can be accurately formed. As a result, positional accuracy of the bus bars 31 in the mold 100 can be further improved.

In the embodiment, as the bus bars 31 are inserted into the caps 61 through the insertion opening section 60, the bus bars 31 can be simply held by the caps 61.

In addition, as the insertion opening section 60 is formed to match a minimum value of plate thickness of the bus bars 31, a clearance between the bus bars 31 and the caps 61 (an opening edge of the insertion opening section 60) can be decreased. For this reason, burrs generated due to the clearance between the bus bars 31 and the caps 61 can be suppressed. Further, when the caps 61 are formed of a resin material or the like, even if the plate thickness of the bus bars 31 becomes larger than that of the insertion opening section 60 due to a tolerance of the bus bars 31, the bus bars 31 can be inserted into the caps 61 while pushing and expanding the insertion opening section 60. Accordingly, the clearance between the bus bars 31 and the caps 61 can be decreased regardless of a variation in plate thickness of the bus bars 31.

The technical scope of the present invention is not limited to the above-mentioned embodiment and various modifications may be added to the above-mentioned embodiment without departing from the scope of the present invention.

For example, while the case in which the caps 61 are formed of an insulating material has been described in the embodiment, it is not limited to this configuration and the caps 61 may be formed of a conductive material.

While the case in which the separate caps 61 are used as the inner holding section has been described in the above-mentioned embodiment, it is not limited to this configuration and the inner holding section and the outer holding section may be formed by two color formation.

While the configuration in which the bus bars 31 include the plurality of extension sections 33, 35, 37 and 39 extending in different directions has been described in the above-mentioned embodiment, it is not limited to this configuration and shapes of the bus bars 31 may be appropriately modified. For example, the bus bars 31 may be linear or may be bent in only two directions. In addition, an angle formed between the extension sections of the bus bars 31 can also be appropriately modified.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A bus bar unit comprising:
    a plurality of bus bars that electrically connects coils of each phase of a rotary electric machine and an external power supply;
    a plurality of inner holding sections that separately covers portions of the plurality of bus bars and separately hold the plurality of bus bars, wherein the plurality of inner holding sections are separately mounted on the plurality of bus bars; and
    an outer holding section that is formed of an insulating material, that collectively covers the plurality of inner holding sections, and that is formed in a state in which the plurality of bus bars are electrically insulated.

2. The bus bar unit according to claim 1, wherein each of the plurality of bus bars comprises:
    a first extension section extending in a first direction; and
    a second extension section connected to the first extension section and extending in a second direction crossing the first direction, and
    wherein the inner holding sections separately support regions of the plurality of bus bars from at least the first extension section to the second extension section via a first connecting portion connecting the first extension section and the second extension section.

3. The bus bar unit according to claim 2, wherein each of the plurality of bus bars comprises a third extension section connected to the second extension section and extending in a third direction crossing the first direction and the second direction, and
    the inner holding sections separately support regions of the plurality of bus bars from at least the first extension section to the third extension section via the first connecting portion and via a second connecting portion connecting the second extension section and the third extension section.

4. The bus bar unit according to claim 1, wherein the inner holding sections are formed of an insulating material.

5. The bus bar unit according to claim 1, further comprising coated sections that separately cover portions of the plurality of bus bars different from the portions supported by the outer holding section, and on which powder coating is performed with an insulating powder material,
    wherein air vent holes that expose the bus bars are formed in the coated sections.

6. The bus bar unit according to claim 1, wherein the inner holding sections have insertion opening sections into which the bus bars are inserted.

* * * * *

UNITED STATES PATENT AND TRADEMARK OFFICE
CERTIFICATE OF CORRECTION

Page 1 of 1

PATENT NO. : 10,192,652 B2
APPLICATION NO. : 15/666710
DATED : January 29, 2019
INVENTOR(S) : Fujiwara et al.

It is certified that error appears in the above-identified patent and that said Letters Patent is hereby corrected as shown below:

On the Title Page

Item (73) should be corrected to read:
(73) Assignees: HONDA MOTOR CO., LTD., Tokyo (JP)
 TAKAGI SEIKO CORPORATION, Toyama (JP)

Signed and Sealed this
Nineteenth Day of November, 2019

Andrei Iancu
*Director of the United States Patent and Trademark Office*